(12) United States Patent
Scholler

(10) Patent No.: US 8,381,102 B1
(45) Date of Patent: Feb. 19, 2013

(54) SYSTEMS AND METHODS FOR VISUALLY SCROLLING THROUGH A STACK OF ITEMS DISPLAYED ON A DEVICE

(75) Inventor: Jerome F. Scholler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/364,272

(22) Filed: Feb. 1, 2012

Related U.S. Application Data

(63) Continuation-in-part of application No. 13/312,865, filed on Dec. 6, 2011.

(60) Provisional application No. 61/586,716, filed on Jan. 13, 2012.

(51) Int. Cl.
*G06F 3/01* (2006.01)
*G06F 3/033* (2006.01)
*G06F 3/14* (2006.01)

(52) U.S. Cl. ......... 715/701; 715/702; 715/863; 715/864

(58) Field of Classification Search .................. 715/702, 715/785, 863, 864
See application file for complete search history.

(56) References Cited

U.S. PATENT DOCUMENTS

| | | | |
|---|---|---|---|
| 2009/0197635 A1* | 8/2009 | Kim et al. | 455/550.1 |
| 2009/0303204 A1* | 12/2009 | Nasiri et al. | 715/856 |
| 2011/0193881 A1* | 8/2011 | Rydenhag | 345/647 |
| 2011/0291945 A1* | 12/2011 | Ewing et al. | 715/784 |

* cited by examiner

*Primary Examiner* — Weilun Lo
*Assistant Examiner* — Truc Chuong
(74) *Attorney, Agent, or Firm* — McDermott Will & Emery LLP

(57) ABSTRACT

Computer-implemented methods for visually scrolling through a stack of items displayed on a device by tilting the device are provided. In one aspect, a method includes determining a neutral reference point for a device, and receiving input indicating a tilting motion from the neutral reference point encountered by the device. The method also includes determining an angular displacement value of the device and a bias factor based on the tilting motion. The angular displacement value is indicative of an angular displacement of the device based on the tilting motion. The method also includes visually scrolling through the stack of items based on the angular displacement value and the bias factor. Systems and machine-readable media are also provided.

20 Claims, 4 Drawing Sheets

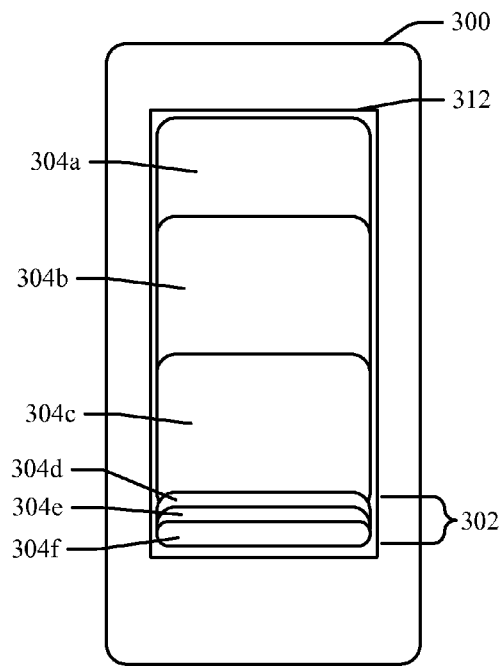
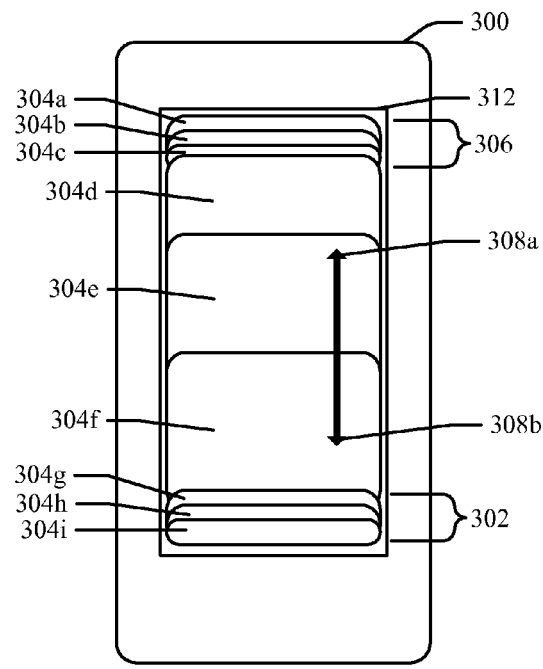
FIG. 3A  FIG. 3B
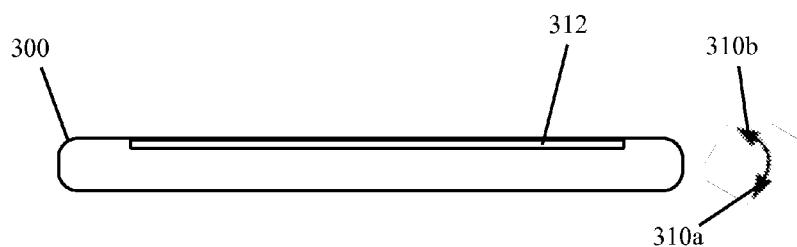
FIG. 3C

SYSTEMS AND METHODS FOR VISUALLY SCROLLING THROUGH A STACK OF ITEMS DISPLAYED ON A DEVICE

CROSS-REFERENCE TO RELATED APPLICATIONS

This application claims the benefit of U.S. Provisional Patent Application Ser. No. 61/586,716, entitled "Systems and Methods for Visually Scrolling Through a Stack of Items Displayed on a Device," filed on Jan. 13, 2012; this application is also a continuation-in-part application of U.S. patent application Ser. No. 13/312,865, entitled "Systems and Methods for Visually Scrolling Through a Stack of Items Displayed on a Device," filed on Dec. 6, 2011; all of the foregoing priority applications are hereby incorporated by reference in their entirety for all purposes.

BACKGROUND

1. Field

The subject technology generally relates to displaying content on computing devices and, in particular, relates to systems and methods for interacting with content displayed on a device.

2. Description of the Related Art

A touch-based device such as a smartphone may allow a user to scroll through content by using the user's finger gestures. For example, while touching a screen of the touch-based device with the user's finger, the user may slide the finger in an upward direction to move the content in the upward direction or may slide the finger in a downward direction to move the content in the downward direction. Unfortunately, if the user desires to scroll through a large amount of content, the user may need to apply repeated finger gestures to scroll through the large amount of content. Thus, it is desirable to scroll through content without necessarily relying on the user's finger gestures for the scrolling.

SUMMARY

According to one embodiment of the present disclosure, a computer-implemented method for visually scrolling through a stack of items displayed on a device by tilting the device is provided. The method includes determining a neutral reference point for a device, and receiving input indicating a tilting motion from the neutral reference point encountered by the device. The method also includes determining an angular displacement value of the device and a bias factor based on the tilting motion. The angular displacement value is indicative of an angular displacement of the device based on the tilting motion. The method also includes visually scrolling through the stack of items based on the angular displacement value and the bias factor.

According to another embodiment of the present disclosure, a system for visually scrolling through a stack of items displayed on a device by tilting the device is provided. The system includes a memory that includes instructions, and a processor. The processor is configured to execute the instructions to determine a neutral reference point for a device and receive input indicating a tilting motion from the neutral reference point encountered by the device. The processor is also configured to execute the instructions to determine an angular displacement value of the device, a speed factor, and a direction factor based on the tilting motion. The angular displacement value is indicative of an angular displacement of the device based on the tilting motion. The processor is also configured to execute the instructions to: reduce the angular displacement value based on the speed factor when a speed of the tilting motion is outside of a predetermined scrolling speed range; reduce the angular displacement value based on the direction factor when a direction of the tilting motion is inconsistent with a predetermined scrolling direction; and visually scroll through the stack of items based on the angular displacement value, the speed factor, and the direction factor.

According to a further embodiment of the present disclosure, a machine-readable storage medium includes machine-readable instructions for causing a processor to execute a method for visually scrolling through a stack of items displayed on a device by tilting the device is provided. The method includes determining a neutral reference point for a device and receiving input indicating a tilting motion from the neutral reference point encountered by the device. The method also includes determining an angular displacement value of the device, a speed factor, and a direction factor based on the tilting motion. The angular displacement value is indicative of an angular displacement of the device based on the tilting motion. The method also includes reducing the angular displacement value to zero based on the speed factor when a speed of the tilting motion is outside of a predetermined scrolling speed range, and reducing the angular displacement value to zero based on the direction factor when a direction of the tilting motion is inconsistent with a predetermined scrolling direction. The method also includes visually scrolling through the stack of items based on the angular displacement value, the speed factor, and the direction factor. The scrolling does not occur when the angular displacement value is zero.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 3A-3C illustrate an example of a device in accordance with various aspects of the subject technology.

DETAILED DESCRIPTION

Figure 1:
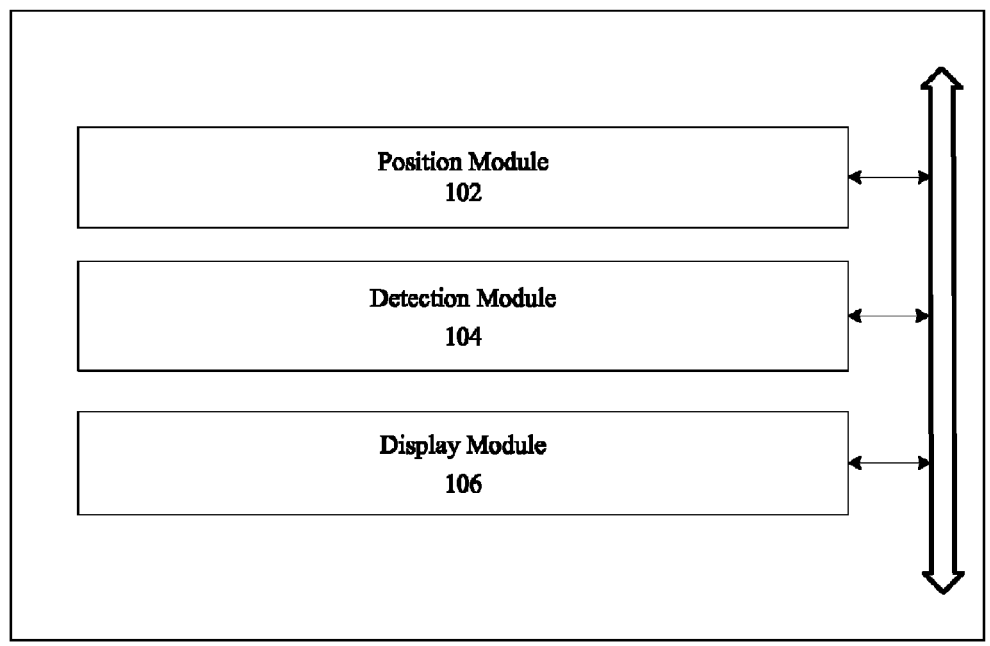
FIG. 1 illustrates an example of a system for visually scrolling through a stack of items displayed on a device, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Touch-based mobile devices such as smartphones and tablets are typically equipped with small screens compared to other computing devices like laptop computers and desktop computers. In this regard, items displayed on the touch-based mobile devices can be stacked on top of one another in order to save space and accommodate the smaller screens. Items that may be stacked include windows, browser tabs, contact pages, documents, images, and other suitable items in a frame format. For example, a mobile device may display multiple windows stacked on top of one another, and a user may select a particular window to be displayed by rearranging the stack of multiple windows or manipulating the stack in some other manner.

The mobile devices are typically equipped with accelerometers and/or gyroscopes. Aspects of the subject technology take advantage of the accelerometers and/or gyroscopes in order to provide a user of a mobile device with an optimized experience for navigating through a stack of items displayed on the mobile device. According to certain aspects, the user may visually scroll through the stack of items by moving the mobile device in an appropriate manner. For example, if the user tilts the mobile device forward while the mobile device is in a portrait mode (e.g., when the screen of the mobile device is oriented vertically from the user's perspective and may be taller than it is wide), the stack of items may be visually scrolled through in an upward direction relative to the screen of the mobile device, thereby allowing the user to quickly view the contents of each of the items as the items move upward without necessarily having to rely on the user's finger gestures for the scrolling. If the user tilts the phone backward while the mobile device is in the portrait mode, the stack of items may be visually scrolled through in a downward direction relative to the screen of the mobile device. The stack of items may be visually scrolled through in a similar manner when the mobile device is in a landscape mode (e.g., when the screen mobile device is oriented horizontally from the user's perspective and may be wider than it is tall), except that the stack of items may be visually scrolled through toward the left or the right relative to the screen depending on how the user tilts the phone. According to certain aspects, either type of scrolling (e.g., upward/downward scrolling or left/right scrolling) may be employed for mobile devices with square screens. In certain aspects, the scrolling is not limited to stacked items, but instead can be any content displayed on the mobile device, such as text (e.g., a web page) or images (e.g., a photograph). Although the examples described in the disclosure refer to scrolling of stacked items displayed on a device, the disclosed system is equally applicable to any content displayed on a device that can be scrolled.

A limitation with scrolling through a stack of items (or other content) as described above is determining a frame of reference from which to begin scrolling. As a user may move and/or place the touch-based mobile device in various positions (e.g., lying flat or propped up), it is generally not known at which point during the movement and/or placement of the phone that the user would like to begin scrolling through the stack of items.

Another limitation with scrolling through a stack of items is that the touch-based mobile device may encounter undesired motions not related to scrolling while the user is scrolling through the stack of items. For example, if the user is scrolling through the stack of items while traveling in a vehicle, a bumpy ride in the vehicle can cause the touch-based device to encounter undesired motions (e.g., shaking, jitters, etc.) that can affect the scrolling of the stack of items.

Yet another limitation with scrolling through a stack of items is that once the user has reached a maximum position at which to tilt the touch-based mobile device, but still desires to scroll in the same direction, any motion by the user to reset the tilt position may also cause the stack of items to undesirably scroll in the reverse direction.

Accordingly, aspects of the subject technology allow a user to scroll through a stack of items on a touch-based mobile device in an accurate manner that reflects the intent of the user and reduces the influence of undesired motions encountered by the device. Specifically, the subject technology takes into account a neutral reference position of the mobile device, random motion experienced by the mobile device, and additional motion by the user once a maximum or near-maximum tilt position is reached by the mobile device.

With reference to the drawings, FIG. 1 illustrates an example of system 100 for visually scrolling through a stack of items displayed on a device, in accordance with various aspects of the subject technology. System 100 comprises position module 102, detection module 104, and display module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
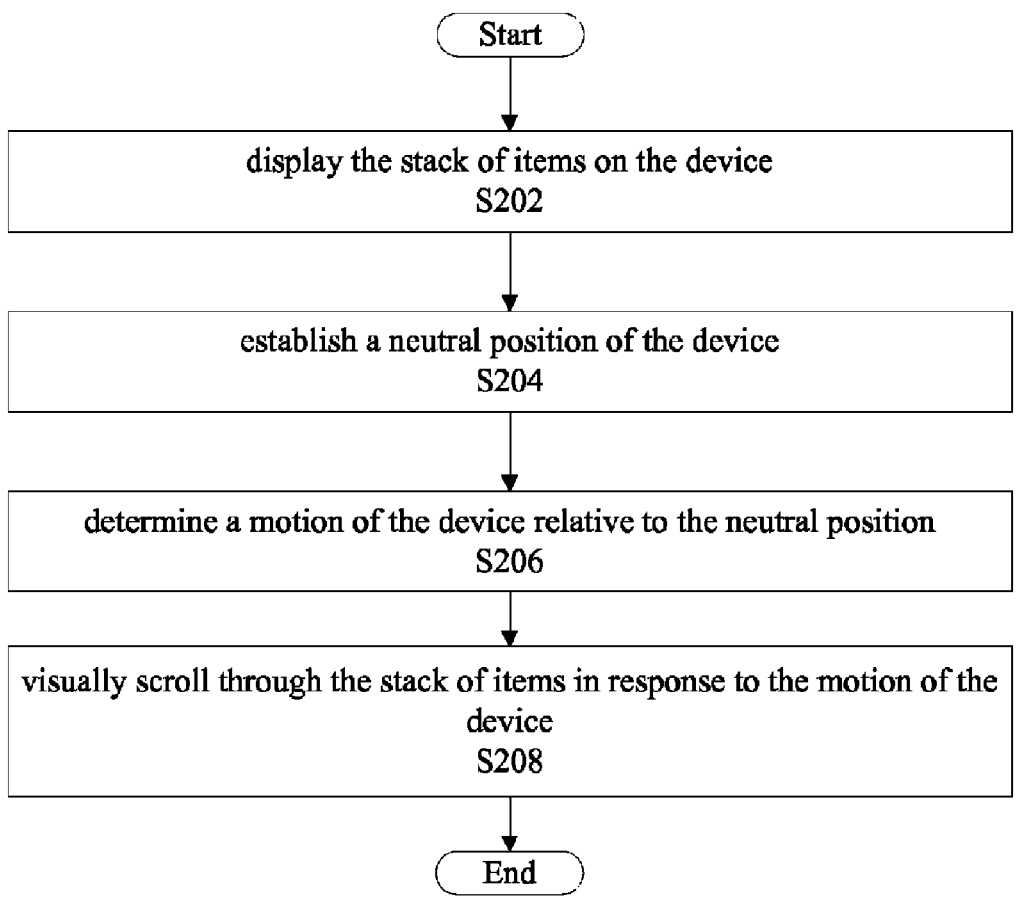
FIG. 2 illustrates an example of a method for visually scrolling through a stack of items displayed on a device, in accordance with various aspects of the subject technology.

FIG. 2 illustrates an example of method 200 for visually scrolling through a stack of items displayed on a device, in accordance with various aspects of the subject technology. FIGS. 3A, 3B, and 3C illustrate an example of device 300, in accordance with various aspects of the subject technology. FIGS. 3A and 3B illustrate a front view of device 300, while FIG. 3C illustrates a side view of device 300. As shown in FIGS. 3A, 3B, and 3C, device 300 comprises a mobile phone. However, device 300 may comprise any suitable device with an accelerometer and/or a gyroscope, such as a tablet computer and a personal digital assistant.

According to step S202 in FIG. 2, display module 106 may display stack of items 302 on device 300. As shown in FIG. 3A, stack of items 302 is displayed on screen 312 of device 300. Stack of items 302 comprises items 304d, 304e, and 304f. For example, item 304f is overlaid on top of item 304e, which is overlaid on top of item 304d. Display module 106 also displays other items 304a, 304b, and 304c. Each of the items displayed may comprise at least one of a window, a browser tab, a contact page, a document, an image, and other suitable content in a frame format. For example, each of the items may be a browser tab that displays a different webpage. Items 304a, 304b, and 304c are shown in FIG. 3A in an expanded state compared to items 304d, 304e, and 304f. For example, each of the expanded items (e.g., items 304a, 304b, and 304c) displays more content than a collapsed one of the stack of items (e.g., items 304d, 304e, and 304f). According to various aspects of the subject technology, stack of items 302 may be visually scrolled through such that one or more of the stack of items 302 may be expanded and/or unstacked in order to allow a user of device 300 to view the content of the expanded and/or unstacked items.

Prior to visually scrolling through stack of items 302, however, position module 102 may establish a neutral position of device 300 according to step S204 in FIG. 2. Because device 300 may be moved in various positions by a user of device 300, the neutral position of device 300, for example, may be used as a point of reference from which to begin visually scrolling stack of items 302. In some aspects, the scrolling of stack of items 302 may be a function of an angular displacement value of device 300, which may be indicative of the angular displacement of device 300 based on how device 300 is moved. For example, the amount of scrolling may be directly proportional to the angular displacement value of device 300. In this regard, the neutral position of device 300 may correspond to a zero angular displacement value of device 300. Thus, position module 102 may establish the neutral position of device 300 by resetting an angular displacement value of device 300 to zero.

In certain aspects, the neutral position for device 300 can be established by reducing the angular displacement value of device 300 to zero over a predetermined duration of time. The angular displacement value of device 300 can be determined based on a bias factor, which may comprise at least one of a speed factor and a direction factor.

The speed factor can be based on the angular speed of device 300 about three axes (e.g., x-axis, y-axis, and z-axis). Since the scrolling generally occurs when device 300 is tilted about one axis, the speed factor may be proportional to the angular speed about that axis, and inversely proportional to a noise factor.

The noise factor can be a representation of the speed of undesired motions encountered by device 300. In some aspects, the noise factor may decrease as the angular speed about the desired axis increases relative to the angular speed about the other two axes. This situation may be reflective of device 300 being tilted about the desired axis, and thus, the desired scrolling is occurring. For example, device 300 may be tilted about the desired axis at a greater speed than the speeds of the device being tilted about the other two axes, thereby giving a greater indication that the desired scrolling is occurring instead of undesired motions. On the other hand, the noise factor may increase as the angular speed about the desired axis decreases relative to the angular speed about the other two axes. This situation may be reflective of undesired motions being encountered by the device. For example, device 300 may be tilted about the three axes at substantially the same speeds, thereby giving a greater indication that scrolling is not occurring, but rather undesired motions. Thus, the desired speed factor allows a user to accurately scroll through a stack of items by reducing the influence of the undesired motions of the device that have a speed outside of the predetermined scrolling speed range.

The direction factor can indicate whether a particular motion of device 300 is in the correct direction for scrolling a stack of items. This may be useful for when the user has reached a maximum position at which to tilt the device, but nevertheless desires to continue scrolling in the same direction (e.g., such as a forward direction). The direction factor may increase when a detected direction of the device is in the direction of scrolling, and may decrease when a detected direction of the device is not in the direction of scrolling. Thus, if the device is in a certain position for the predetermined time duration, then scrolling can begin as soon as the device is tilted from that position. For example, a user can choose to begin scrolling from a certain position simply by holding the device still at that position for the predetermined time duration, and then begin scrolling from that position.

The neutral position for device 300 can be determined based on a sensor sample that can, for example, be measured 60 times per second. The sensor sample can then be applied in an equation that applies a cosine function to the current angle of device 300 for a decreasing curve over time (e.g., over a few seconds).

According to certain aspects, user input received from the user of device 300 can be used to establish the neutral position. The user input, for example, may comprise at least one of a touch-based input, a button-based input, or other suitable user input. This user input may indicate that the user is using device 300 and does not wish to visually scroll through stack of items 302 based on the movement of device 300. For example, the user may be using finger gestures or button inputs to interact with content displayed on screen 312 of device 300. During this time, the user may not necessarily desire to visually scroll through stack of items 302 based on the movement of device 300, especially if the movement is unintentional. In this regard, detection module 104 may monitor device 300 for the user input and may establish the neutral position of device 300 upon completion of the user input.

According to step S206 in FIG. 2, detection module 104 may determine a motion of device 300 relative to the neutral position of device 300. For example, as shown in FIG. 3C, device 300 may be tilted in the direction of either arrow 310*a* or arrow 310*b*. In some aspects, the motion of device 300 may comprise at least one of a velocity of device 300 (e.g., angular velocity) and a displacement of device 300 (e.g., angular displacement). Detection module 104 may receive the velocity from an accelerometer and/or a gyroscope of device 300. Furthermore, detection module 104 may determine the angular displacement value of device 300 relative to the neutral position by multiplying a duration of the motion of device 300 with the angular velocity of device 300.

According to step S208 in FIG. 2, display module 106 may visually scroll through stack of items 302 in response to the motion of device 300. In some aspects, stack of items 302 may be scrolled through based on the angular displacement value of device 300.

In order to address undesired motions encountered by device 300, the noise factor can be a representation of the speed of undesired motions encountered by device 300 as discussed above. The noise factor can increase as the angular speed about the desired axis decreases relative to the angular speed about the other two axes. This situation may be reflective of undesired motions being encountered by device 300. For example, device 300 may be tilted about the three axes at substantially the same speeds, thereby giving a greater indication that scrolling is not occurring, but rather undesired motions. Thus, the desired speed factor allows a user to accurately scroll through a stack of items by reducing the influence of the undesired motions of the device that have a speed outside of the predetermined scrolling speed range.

In order to address the limitation of device 300 reaching a maximum tilting position, the direction factor may increase when a detected direction of the device is in the direction of scrolling, and may decrease when a detected direction of the device is not in the direction of scrolling as discussed above. In this sense, the desired direction factor may be adjusted to allow the user to tilt device 300 forward to scroll in the forward direction, and if the user reaches a maximum tilting position, to allow the user to tilt the device in the reverse direction without scrolling in the reverse direction so that the user may reset the device to a more convenient position for tilting the device forward again to continue scrolling in the forward direction.

By way of example, approaches for addressing undesired motions encountered by device 300 and addressing the limitation of device 300 reaching a maximum tilting position will be provided. Initially, an unbiased angular velocity of device 300 is determined, for example, by obtaining a sampling of angular velocity values from the accelerometer and/or gyroscope of device 300 over a brief period of time and then averaging the values. Alternatively, an unbiased angular velocity of device 300 is determined by setting the angular velocity value to zero. Next, and as discussed above, a neutral reference position (e.g., from which to begin scrolling of displayed content) is established for device 300 by applying a cosine function (e.g., a "fade to zero over time" function) to the current angle of device 300 for a decreasing curve over time (e.g., over a few seconds). A current angular displacement value (e.g., to facilitate determination of a speed and direction of scrolling of displayed content) is then set to a combination of the neutral reference position of device 300 with a new angular displacement value of device 300, namely, an unbiased angular velocity of device 300 multiplied by the change in time between the values taken for the unbiased angular velocity. This value is then multiplied by a speed factor and a good direction factor.

The speed factor, which ranges between 0 and 1, increases in value with increasing motion of the device and decreases in value on noise experienced by device 300 or an absence of motion for device 300. In certain aspects, the speed factor is equal to a prior speed factor value combined with an unbiased velocity of device 300, multiplied by 1 minus the noise value for device 300. The noise value also ranges between 0 and 1 and, as discussed above, increases with noise (e.g., movement) on the Y-axis and/or Z-axis of the accelerometer and/or gyroscope, but reduces with noise on the X-axis of the accelerometer and/or gyroscope. The prior speed factor can also be managed using the fade to zero over time function.

The direction factor ranges between 0 and 1. The direction factor is closer to 1 when the current angular velocity of device 300 matches the current scrolling direction of content displayed on device 300, and is closer to zero when the current angular velocity of device 300 does not match the current scrolling direction of content displayed on device 300. Initially, a direction value is determined by taking a running average of an angular velocity of device 300 over a brief period of time, cubing that value, and then subtracting a running average of an angular velocity of device 300 over an even longer period of time. The closer in value the determined direction value is to the unbiased velocity, the greater the likelihood that the direction of tilting of device 300 is intended to be for scrolling content displayed on device 300.

These and other example approaches for determining a direction and speed for scrolling content displayed on a device 300 are relevant to the drawings of FIGS. 3A-3C. With reference to FIG. 3C, the right side of device 300 may correspond to a top side of device 300 in FIGS. 3A and 3B. If device 300 is tilted in the direction of arrow 310a in FIG. 3C, then stack of items 302 may be visually scrolled in the direction of arrow 308a in FIG. 3B. Conversely, if device 300 is tilted in the direction of arrow 310b, then stack of items may be visually scrolled in the direction of arrow 308b in FIG. 3B. Scrolling through stack of items 302 in this manner may provide the user with the perception that gravity has an impact on the scrolling, thereby allowing the user to scroll intuitively. Stack of items 302 may be visually scrolled through in a similar manner when device 300 is in a landscape mode, except that stack of items 302 may be visually scrolled through toward the left or the right of screen 312 (when the user is viewing device 300 in landscape mode) depending on how the user tilts device 300. Furthermore, a speed of the scrolling may be proportional to a speed of the motion of device 300 (e.g., the faster the motion, the faster the scrolling may be). Scrolling through stack of items 302 using such a relationship may provide the user with the perception that a centrifugal force has an impact on the scrolling, thereby allowing the user to scroll intuitively.

According to certain aspects, stack of items 302 may be visually scrolled through by unstacking and/or expanding one or more of stack of items 302. For example, FIG. 3B illustrates device 300 after stack of items 302 has been visually scrolled through in the direction of arrow 308a compared to device 300 in FIG. 3A. Compared to items 304a, 304b, and 304c in FIG. 3A, these items in FIG. 3B are visually scrolled in the direction of arrow 308a and collapsed into an unexpanded state to form stack of items 306 at a top of screen 312. Furthermore, while items 304d, 304e, and 304f are collapsed in an unexpanded state in FIG. 3A, these items are visually scrolled in the direction of arrow 308a and expanded as shown in FIG. 3B. As a result of items 304d, 304e, and 304f being expanded in the direction of arrow 308a, new items (e.g., items 304g, 304h, and 304i) are revealed as part of stack of items 302. In some aspects, items may be visually scrolled in the same order as which they are stacked, which allows stack of items 306 to be stacked in a reverse order relative to the order of stack of items 302.

According to various aspects of the subject technology, display module 106 may suspend the scrolling upon the user input (e.g., a touch-based input and/or a button-based input) being detected by detection module 104. For example, as discussed above, detection module 104 may monitor device 300 for the user input. The detection of the user input by detection module 104 may indicate that the user has identified content displayed on screen 312 that the user would like to interact with. Thus, scrolling can be suspended upon detection of the user input to allow the user to interact with the content displayed. For example, as stack of items 302 is being visually scrolled through in the direction of arrow 308a, item 304e may become displayed (e.g., as shown in FIG. 3B). The user may desire to interact with the content of item 304e. In this regard, the user may touch item 304e to select the content of item 304e to be displayed. At this point, display module 106 may suspend the scrolling so that item 304e does not continue visually scrolling to the top of screen 312.

Figure 4:
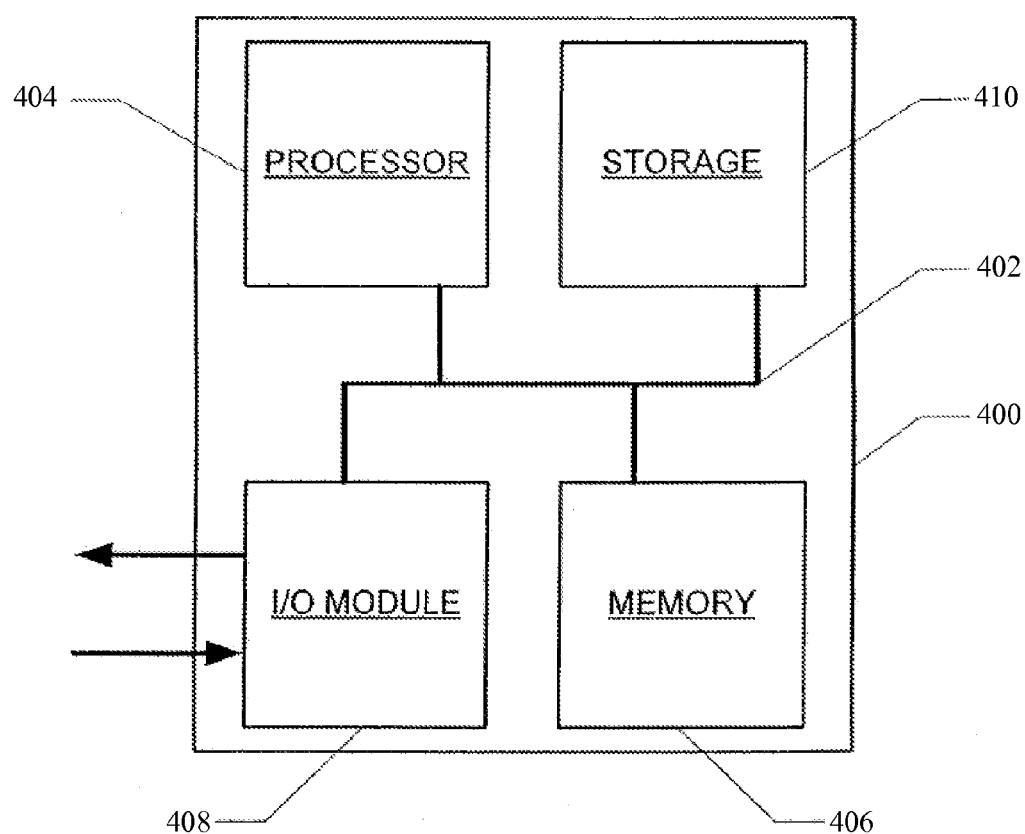
FIG. 4 is a block diagram illustrating components of a controller in accordance with various aspects of the subject technology.

FIG. 4 is a block diagram illustrating components of controller 400, in accordance with various aspects of the subject technology. Controller 400 comprises processor module 404, storage module 410, input/output (I/O) module 408, memory module 406, and bus 402. Bus 402 may be any suitable communication mechanism for communicating information. Processor module 404, storage module 410, I/O module 408, and memory module 406 are coupled with bus 402 for communicating information between any of the modules of controller 400 and/or information between any module of controller 400 and a device external to controller 400. For example, information communicated between any of the modules of controller 400 may include instructions and/or data. In some aspects, bus 402 may be a universal serial bus. In some aspects, bus 402 may provide Ethernet connectivity.

In some aspects, processor module 404 may comprise one or more processors, where each processor may perform different functions or execute different instructions and/or processes. For example, one or more processors may execute instructions for visually scrolling through a stack of items displayed on a device (e.g., method 200), and one or more processors may execute instructions for input/output functions.

Memory module 406 may be random access memory ("RAM") or other dynamic storage devices for storing information and instructions to be executed by processor module 404. Memory module 406 may also be used for storing temporary variables or other intermediate information during execution of instructions by processor 404. In some aspects, memory module 406 may comprise battery-powered static RAM, which stores information without requiring power to maintain the stored information. Storage module 410 may be a magnetic disk or optical disk and may also store information and instructions. In some aspects, storage module 410 may comprise hard disk storage or electronic memory storage (e.g., flash memory). In some aspects, memory module 406 and storage module 410 are both a machine-readable medium.

Controller 400 is coupled via I/O module 408 to a user interface for providing information to and receiving information from an operator of system 100. For example, the user interface may be a cathode ray tube ("CRT"), a touch screen, or an LCD monitor for displaying information to an operator. The user interface may also include, for example, a keyboard, a mouse, or a touch screen coupled to controller 400 via I/O module 408 for communicating information and command selections to processor module 404.

According to various aspects of the subject disclosure, methods described herein are executed by controller 400. Specifically, processor module 404 executes one or more sequences of instructions contained in memory module 406 and/or storage module 410. In one example, instructions may be read into memory module 406 from another machine-readable medium, such as storage module 410. In another example, instructions may be read directly into memory module 406 from I/O module 408, for example from an operator of system 100 via the user interface. Execution of the sequences of instructions contained in memory module 406 and/or storage module 410 causes processor module 404 to perform methods to visually scroll through a stack of items displayed on a device. For example, a computational algorithm for visually scrolling through a stack of items displayed on a device may be stored in memory module 406 and/or storage module 410 as one or more sequences of instructions. Information such as the motion of the device, the neutral position of the device, the stack of items, the speed of the scrolling, the speed of the motion of the device, the direction of the scrolling, the direction of the motion of the device, the order of the stack of items, the user input, the speed factor, the direction factor, and/or other suitable information may be communicated from processor module 404 to memory module 406 and/or storage module 410 via bus 402 for storage. In some aspects, the information may be communicated from processor module 404, memory module 406, and/or storage module 410 to I/O module 408 via bus 402. The information may then be communicated from I/O module 408 to an operator of system 100 via the user interface.

One or more processors in a multi-processing arrangement may also be employed to execute the sequences of instructions contained in memory module 406 and/or storage module 410. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 404 for execution. Such a medium may take many forms, including, but not limited to, non-volatile media and volatile media. Non-volatile media include, for example, optical or magnetic disks, such as storage module 410. Volatile media include dynamic memory, such as memory module 406. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The subject technology is illustrated, for example, according to various aspects described below. These are provided as examples, and do not limit the subject technology. In some aspects, any of the following examples may depend from any one of the other examples. In some aspects, any of the examples may be combined with any other examples.

According to various aspects of the subject technology, a computer-implemented method for visually scrolling through a stack of items displayed on a device by tilting the device is provided. The method comprises determining a neutral reference point for a device, and receiving input indicating a tilting motion from the neutral reference point encountered by the device. The method also comprises determining an angular displacement value of the device and a bias factor based on the tilting motion. The angular displacement value is indicative of an angular displacement of the device based on the tilting motion. The method also comprises visually scrolling through the stack of items based on the angular displacement value and the bias factor.

In some aspects, determining the bias factor comprises determining at least one of a speed factor and a direction factor. The method also comprises reducing the angular displacement value based on the speed factor when a speed of the tilting motion is outside of a predetermined scrolling speed range, and reducing the angular displacement value based on the direction factor when a direction of the tilting motion is inconsistent with a predetermined scrolling direction. In some aspects, the angular displacement value is reduced to zero based on the speed factor when the speed of the tilting motion is outside of the predetermined scrolling speed range, and the scrolling does not occur when the angular displacement value is zero. In some aspects, the angular displacement value is reduced to zero based on the direction factor when the direction of the tilting motion is inconsistent with the predetermined scrolling direction, and the scrolling does not occur when the angular displacement value is zero.

According to certain aspects, the angular displacement is along a single axis. The method also comprises fading the angular displacement value over a predetermined time duration. In some aspects, the speed factor is based on a previously determined speed factor, the angular displacement, and a noise factor. The angular displacement is along an X-axis, and the noise factor is based on a magnitude of an angle velocity along a Y-axis and a Z-axis. In some aspects, the method comprises reducing the noise factor when a magnitude of angle velocity along the X-axis is substantially greater than a magnitude of the angle velocity along at least one of the Y-axis and the Z-axis. In some aspects, the method comprises increasing the noise factor when a magnitude of angle velocity along the X-axis is substantially equal to a magnitude of the angle velocity along at least one of the Y-axis and the Z-axis.

According to various aspects of the subject technology, a system for visually scrolling through a stack of items displayed on a device by tilting the device is provided. The system comprises a memory comprising instructions, and a processor. The processor is configured to execute the instructions to: determine a neutral reference point for a device; receive input indicating a tilting motion from the neutral reference point encountered by the device; and determine an angular displacement value of the device, a speed factor, and a direction factor based on the tilting motion. The angular displacement value is indicative of an angular displacement of the device based on the tilting motion. The processor is also configured to execute the instructions to: reduce the angular displacement value based on the speed factor when a speed of the tilting motion is outside of a predetermined scrolling speed range; reduce the angular displacement value based on the direction factor when a direction of the tilting motion is inconsistent with a predetermined scrolling direction; and visually scroll through the stack of items based on the angular displacement value, the speed factor, and the direction factor.

In some aspects, the angular displacement value is reduced to zero based on the speed factor when the speed of the tilting motion is outside of the predetermined scrolling speed range, and the scrolling does not occur when the angular displacement value is zero. In some aspects, the angular displacement value is reduced to zero based on the direction factor when the direction of the motion is inconsistent with the predetermined scrolling direction, and the scrolling does not occur when the angular displacement value is zero.

In some aspects, the angular displacement is along a single axis. The processor is further configured to execute the instructions to fade the angular displacement value over a predetermined time duration. In some aspects, the speed factor is based on a previously determined speed factor, the angular displacement, and a noise factor. The angular displacement is along an X-axis, and the noise factor is based on a magnitude of an angle velocity along a Y-axis and a Z-axis. In some aspects, the processor is further configured to execute the instructions to reduce the noise factor when a magnitude of angle velocity along the X-axis is substantially greater than a magnitude of the angle velocity along at least one of the Y-axis and the Z-axis. In some aspects, the processor is further configured to execute the instructions to increase the noise factor when a magnitude of angle velocity along the X-axis is substantially equal to a magnitude of the angle velocity along at least one of the Y-axis and the Z-axis.

According to various aspects of the subject technology, a machine-readable storage medium comprising machine-readable instructions for causing a processor to execute a method for visually scrolling through a stack of items displayed on a device by tilting the device is provided. The method comprises: determining a neutral reference point for a device; receiving input indicating a tilting motion from the neutral reference point encountered by the device; and determining an angular displacement value of the device, a speed factor, and a direction factor based on the tilting motion. The angular displacement value is indicative of an angular displacement of the device based on the tilting motion. The method also comprises: reducing the angular displacement value to zero based on the speed factor when a speed of the tilting motion is outside of a predetermined scrolling speed range; reducing the angular displacement value to zero based on the direction factor when a direction of the tilting motion is inconsistent with a predetermined scrolling direction; and visually scrolling through the stack of items based on the angular displacement value, the speed factor, and the direction factor. In some aspects, the scrolling does not occur when the angular displacement value is zero.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "right," "left," "up," "down," "forward," "backward," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A computer-implemented method for visually scrolling through a stack of items displayed on a device by tilting the device, the method comprising:
    determining a neutral reference point for a device;
    receiving input indicating a tilting motion from the neutral reference point encountered by the device;
    determining an angular displacement value of the device and a bias factor based on the tilting motion, the angular displacement value being indicative of an angular displacement of the device based on the tilting motion; and
    visually scrolling through the stack of items based on the angular displacement value and the bias factor,
    wherein the bias factor comprises a noise factor representing a speed of undesired motions.

2. The computer-implemented method of claim 1,
    wherein determining the bias factor further comprises determining at least one of a speed factor and a direction factor, and
    wherein the method further comprises:
        reducing the angular displacement value based on the speed factor when a speed of the tilting motion is outside of a predetermined scrolling speed range; and
        reducing the angular displacement value based on the direction factor when a direction of the tilting motion is inconsistent with a predetermined scrolling direction.

3. The computer-implemented method of claim 2, wherein the angular displacement value is reduced to zero based on the speed factor when the speed of the tilting motion is outside of the predetermined scrolling speed range, and wherein the scrolling does not occur when the angular displacement value is zero.

4. The computer-implemented method of claim 2, wherein the angular displacement value is reduced to zero based on the direction factor when the direction of the tilting motion is inconsistent with the predetermined scrolling direction, and wherein the scrolling does not occur when the angular displacement value is zero.

5. The computer-implemented method of claim 2, wherein the speed factor is based on a previously determined speed factor, the angular displacement, and the noise factor.

6. The computer-implemented method of claim 5, wherein the angular displacement is along an X-axis, and wherein the noise factor is based on a magnitude of an angle velocity along a Y-axis and a Z-axis.

7. The computer-implemented method of claim 6, further comprising reducing the noise factor when a magnitude of angle velocity along the X-axis is substantially greater than a magnitude of the angle velocity along at least one of the Y-axis and the Z-axis.

8. The computer-implemented method of claim 6, further comprising increasing the noise factor when a magnitude of angle velocity along the X-axis is substantially equal to a magnitude of the angle velocity along at least one of the Y-axis and the Z-axis.

9. The computer-implemented method of claim 1, wherein the angular displacement is along a single axis.

10. The computer-implemented method of claim 1, further comprising fading the angular displacement value over a predetermined time duration.

11. A system for visually scrolling through a stack of items displayed on a device by tilting the device, the system comprising:
    a memory comprising instructions;
    a processor configured to execute the instructions to:
        determine a neutral reference point for a device;
        receive input indicating a tilting motion from the neutral reference point encountered by the device;
        determine an angular displacement value of the device, a speed factor, and a direction factor based on the tilting motion, the angular displacement value being indicative of an angular displacement of the device based on the tilting motion;
        reduce the angular displacement value based on the speed factor when a speed of the tilting motion is outside of a predetermined scrolling speed range;
        reduce the angular displacement value based on the direction factor when a direction of the tilting motion is inconsistent with a predetermined scrolling direction; and
        visually scroll through the stack of items based on the angular displacement value, the speed factor, and the direction factor,
    wherein the speed factor comprises a noise factor representing a speed of undesired motions.

12. The system of claim 11, wherein the angular displacement value is reduced to zero based on the speed factor when the speed of the tilting motion is outside of the predetermined scrolling speed range, and wherein the scrolling does not occur when the angular displacement value is zero.

13. The system of claim 11, wherein the angular displacement value is reduced to zero based on the direction factor when the direction of the motion is inconsistent with the predetermined scrolling direction, and wherein the scrolling does not occur when the angular displacement value is zero.

14. The system of claim 11, wherein the angular displacement is along a single axis.

15. The system of claim 11, wherein the speed factor is based on a previously determined speed factor, the angular displacement, and the noise factor.

16. The system of claim 15, wherein the angular displacement is along an X-axis, and wherein the noise factor is based on a magnitude of an angle velocity along a Y-axis and a Z-axis.

17. The system of claim 16, wherein the processor is further configured to execute the instructions to reduce the noise factor when a magnitude of angle velocity along the X-axis is substantially greater than a magnitude of the angle velocity along at least one of the Y-axis and the Z-axis.

18. The system of claim 16, wherein the processor is further configured to execute the instructions to increase the noise factor when a magnitude of angle velocity along the X-axis is substantially equal to a magnitude of the angle velocity along at least one of the Y-axis and the Z-axis.

19. The system of claim 11, wherein the processor is further configured to execute the instructions to fade the angular displacement value over a predetermined time duration.

20. A non-transitory machine-readable storage medium comprising machine-readable instructions for causing a processor to execute a method for visually scrolling through a stack of items displayed on a device by tilting the device, the method comprising:

determining a neutral reference point for a device;

receiving input indicating a tilting motion from the neutral reference point encountered by the device;

determining an angular displacement value of the device, a speed factor, and a direction factor based on the tilting motion, the angular displacement value being indicative of an angular displacement of the device based on the tilting motion;

reducing the angular displacement value to zero based on the speed factor when a speed of the tilting motion is outside of a predetermined scrolling speed range;

reducing the angular displacement value to zero based on the direction factor when a direction of the tilting motion is inconsistent with a predetermined scrolling direction; and visually scrolling through the stack of items based on the angular displacement value, the speed factor, and the direction factor, wherein the speed factor comprises a noise factor representing a speed of undesired motions, and wherein the scrolling does not occur when the angular displacement value is zero.

\* \* \* \* \*